United States Patent
Ji et al.

(10) Patent No.: US 10,148,333 B2
(45) Date of Patent: Dec. 4, 2018

(54) FEEDBACK TRANSMITTING AND RECEIVING METHOD AND DEVICE IN MOBILE COMMUNICATION SYSTEM

(71) Applicant: Samsung Electronics Co., Ltd, Gyeonggi-do (KR)

(72) Inventors: Hyoungju Ji, Seoul (KR); Younsun Kim, Gyeonggi-do (KR); Hyojin Lee, Gyeonggi-do (KR); Youngwoo Kwak, Gyeonggi-do (KR); Juho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/316,156

(22) PCT Filed: Jun. 3, 2015

(86) PCT No.: PCT/KR2015/005588
§ 371 (c)(1),
(2) Date: Dec. 2, 2016

(87) PCT Pub. No.: WO2015/186974
PCT Pub. Date: Dec. 10, 2015

(65) Prior Publication Data
US 2017/0141832 A1  May 18, 2017

(30) Foreign Application Priority Data

Jun. 3, 2014 (KR) .................. 10-2014-0067767

(51) Int. Cl.
*H04L 1/00* (2006.01)
*H04L 12/26* (2006.01)
(Continued)

(52) U.S. Cl.
CPC ......... *H04B 7/0626* (2013.01); *H04B 7/0478* (2013.01); *H04B 7/0645* (2013.01);
(Continued)

(58) Field of Classification Search
CPC .................. H04W 24/08; H04W 28/0236; H04L 5/0048; H04B 7/0626
See application file for complete search history.

(56) References Cited

U.S. PATENT DOCUMENTS

2011/0261733 A1  10/2011  Kwon et al.
2012/0147773 A1   6/2012  Kim et al.
(Continued)

OTHER PUBLICATIONS

International Search Report dated Sep. 15, 2015 in connection with International Application No. PCT/KR2015/005588, 5 pages.
(Continued)

*Primary Examiner* — Maharishi V Khirodhar

(57) ABSTRACT

According to an embodiment of the present invention, provided are a method for receiving channel measurement information of a base station in a mobile communication system, including: transmitting, to a terminal, a first control message including a CSI-RS and a CSI-IM resource configuration information; transmitting, to the terminal, a second control message including at least one first information for a channel measurement and at least one second information for an interference measurement; and receiving, from the terminal, channel state feedback information measured on the basis of the first control message and the second control message. The present disclosure relates to a communication method and system for converging a 5$^{th}$-Generation (5G) communication system for supporting higher data rates beyond a 4$^{th}$-Generation (4G) system with a technology for Internet of Things (IoT).

16 Claims, 13 Drawing Sheets

(51) Int. Cl.
  *H04L 12/28* (2006.01)
  *H04B 7/06* (2006.01)
  *H04L 5/00* (2006.01)
  *H04W 24/08* (2009.01)
  *H04W 28/02* (2009.01)
  *H04B 7/0456* (2017.01)

(52) U.S. Cl.
  CPC .......... *H04L 5/0048* (2013.01); *H04L 5/0094* (2013.01); *H04W 24/08* (2013.01); *H04W 28/0236* (2013.01); *H04B 7/063* (2013.01); *H04B 7/0632* (2013.01); *H04B 7/0639* (2013.01); *H04L 5/0023* (2013.01); *H04L 5/0035* (2013.01); *H04L 5/0073* (2013.01)

(56) References Cited

U.S. PATENT DOCUMENTS

| | | |
|---|---|---|
| 2012/0176965 A1 | 7/2012 | Zhu et al. |
| 2012/0287875 A1* | 11/2012 | Kim ...................... H04B 7/024 370/329 |
| 2013/0242902 A1* | 9/2013 | Liu ...................... H04W 24/10 370/329 |
| 2013/0258965 A1 | 10/2013 | Geirhofer et al. |
| 2013/0258973 A1 | 10/2013 | Khoshnevis et al. |
| 2014/0010126 A1 | 1/2014 | Sayana et al. |
| 2014/0036796 A1* | 2/2014 | Etemad .................. H04W 4/70 370/329 |
| 2014/0086084 A1* | 3/2014 | Bi ........................ H04L 1/0026 370/252 |
| 2014/0112173 A1 | 4/2014 | Hammarwall et al. |
| 2015/0131563 A1* | 5/2015 | Guo ..................... H04B 7/0626 370/329 |

OTHER PUBLICATIONS

Written Opinion of the International Searching Authority dated Sep. 15, 2015 in connection with International Application No. PCT/KR2015/005588, 6 pages.

\* cited by examiner

FIG. 9

|        | Signal part | Interference part |
|--------|-------------|-------------------|
| Case A | CSI-RS resource index #1 | IMR resource index |
| Case B | CSI-RS resource index #1<br>CSI-RS resource index #2 | IMR resource index |
| Case C | CSI-RS resource index #1 | IMR resource index #1<br>IMR resource index #2 |
| Case D | CSI-RS resource index #1 | IMR resource index #1<br>CSI-RS resource index #2 |

# FEEDBACK TRANSMITTING AND RECEIVING METHOD AND DEVICE IN MOBILE COMMUNICATION SYSTEM

CROSS-REFERENCE TO RELATED APPLICATIONS

The present application claims priority under 35 U.S.C. § 365 to International Patent Application No. PCT/KR2015/005588 filed Jun. 3, 2015, entitled "FEEDBACK TRANSMITTING AND RECEIVING METHOD AND DEVICE IN MOBILE COMMUNICATION SYSTEM", and, through International Patent Application No. PCT/KR2015/005588, to Korean Patent Application No. 10-2014-0067767 filed Jun. 3, 2014, each of which are incorporated herein by reference into the present disclosure as if fully set forth herein.

TECHNICAL FIELD

The present invention relates to a feedback transmitting and receiving method and device in a mobile communication system. More specifically, the present invention relates to a feedback transmitting and receiving method and device in a mobile communication system capable of using a plurality of active array antennas.

BACKGROUND ART

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a communication system beyond 4G network or a system since the post LTE. To achieve a high data transmission rate, the 5G communication system is considered to be implemented in a super high frequency (mmWave) band (for example, like 60 GHz band). To relieve a path loss of a radio wave and increase a transfer distance of a radio wave in the super high frequency band, in the 5G communication system, beamforming, massive MIMO, full dimensional MIMO (FD-MIMO), array antenna, analog beam-forming, large scale antenna technologies have been discussed. Further, to improve a network of the system, in the 5G communication system, technologies such as advanced small cell, cloud radio access network cloud (RAN), ultra-dense network, device to device communication (D2D), wireless backhaul, moving network, cooperative communication, coordinated multi-points (CoMP), and interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) which are an advanced access technology, and so on have been developed.

Meanwhile, the Internet is evolved to an Internet of Things (IoT) network that transmits and receives information, such as things, between distributed components and processes the information, in a human-centered connection network through which a human being generates and consumes information. The Internet of Everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service by fusing and combining the existing information technology (IT) with various industries.

Therefore, various tries to apply the 5G communication system to the IoT network have been conducted. For example, the 5G communication technologies such as the technologies of the sensor network, the machine to machine (M2M), the machine type communication (MTC) are implemented by techniques such as the beam-forming, the MIMO, the array antenna, or the like. An example of the application of the cloud radio access network (cloud RAN) as the big data processing technology described above may also be the fusing of the 5G technology with the IoT technology.

A current mobile communication system has been developed from a mobile communication system providing a voice centered service in the early stage toward high-speed, high-quality wireless packet data communication system for providing a data service and a multimedia service. For this purpose, various standardization organizations such as 3GPP, 3GPP2, and IEEE have progressed a 3rd advanced mobile communication system standard to which a multiple access scheme using a multi-carrier is applied. Recently, various mobile communication standards such as long term evolution (LTE) of the 3GPP, ultra mobile broadband (UMB) of the 3GPP2, and 802.16m of the IEEE have been developed to support a high-speed, high-quality wireless radio data transmission service based on the multiple access scheme using the multi-carrier.

The existing 3rd advanced mobile communication systems such as LTE, UMB, and 802.16m are based on a multi-carrier multiple access scheme, applies a multiple input multiple output (MIMO) to improve transmission efficiency, and uses various technologies such as a beam-forming method, an adaptive modulation and coding (AMC) method, a channel sensitive scheduling method. The above-mentioned technologies improves transmission efficiency by a method for intensifying transmission power transmitted from several antennas or controlling the transmitted amount of data depending on channel quality, or the like and transmitting selectively data to a user having good channel quality, thereby improving system capacity performance.

Since most of the techniques are operated based on the channel state information between an evolved node B (eNB) (base station (BS)) and a terminal (user equipment (UE), mobile station (MS)), the eNB or the UE needs to measure the channel state between the base station and the terminal. For this purpose, a channel state indication reference signal (CSI-RS) is used. The above-mentioned eNB means a downlink transmitting apparatus and an uplink receiving apparatus that are positioned at a constant place and one eNB performs transmission/reception to and from a plurality of cells. In one mobile communication system, a plurality of eNBs are geographically dispersed and each eNB performs transmission/reception to and from a plurality of cells.

DISCLOSURE OF INVENTION

Technical Problem

The present invention has been made in order to solve the above problems, and an object of the present invention is to provide an efficient feedback transmitting and receiving method and device in a mobile communication system. Another object of the present invention relates to a feedback transmitting and receiving method and device in a mobile communication system capable of using a plurality of active array antennas.

Still another object of the present invention is to provide a method and an apparatus for allowing a terminal to measure a reference signal, generate channel state information, and transmit the channel state information for effective data transmission and reception in transmission and reception of at least one multiple active antenna array system based on an LTE-A system Still yet another object of the present invention is to provide a method and an apparatus for transmitting a reference signal from a base station to a terminal and receiving, by the terminal, the transmitted channel state information.

Solution to Problem

In order to achieve the objects, according to an embodiment of the present invention, a method for receiving channel measurement information of a base station in a mobile communication system may include: transmitting, to a terminal, a first control message including a channel state information reference signal (hereinafter, referred to as CSI-RS) and channel state information interference measurement (hereinafter, referred to as CSI-IM) resource configuration information; transmitting, to the terminal, a second control message including at least one first information for a channel measurement and at least second information for an interference measurement; and receiving, from the terminal, channel state feedback information measured on the basis of the first control message and the second control message, wherein the first information is selected from the CSI-RS resource configuration information, and the second information is selected from the CSI-RS resource configuration information or the CSI-IM resource configuration information.

In order to achieve the objects, according to an embodiment of the present invention, a base station apparatus for receiving channel measurement information in a mobile communication system may include: a communication unit transmitting and receiving a signal to at least one network node; and a control unit performing a control to transmit, to a terminal, a first control message including a channel state information reference signal (hereinafter, referred to as CSI-RS) and channel state information interference measurement (hereinafter, referred to as CSI-IM) resource configuration information; transmit, to the terminal, a second control message including at least one first information for a channel measurement and at least second information for an interference measurement; and receive, from the terminal, channel state feedback information measured on the basis of the first control message and the second control message, wherein the first information is selected from the CSI-RS resource configuration information, and the second information is selected from the CSI-RS resource configuration information or the CSI-IM resource configuration information.

In order to achieve the objects, according to an embodiment of the present invention, a method for reporting channel measurement information of a terminal in a mobile communication system may include: receiving, by the terminal, a first control message including a channel state information reference signal (hereinafter, referred to as CSI-RS) and channel state information interference measurement (hereinafter, referred to as CSI-IM) resource configuration information from a base station; receiving, from the base station, a second control message including at least one first information for a channel measurement and at least one second information for interference measurement; estimating a channel state for the base station on the basis of the first control message and the second control message; and reporting the channel state estimation result to the base station, wherein the first information is selected from the CSI-RS resource configuration information, and the second information is selected from the CSI-RS resource configuration information or the CSI-IM resource configuration information.

In order to achieve the objects, according to an embodiment of the present invention, a terminal apparatus for reporting channel measurement information in a mobile communication system may include: a communication unit transmitting and receiving a signal to at least one network node; and a control unit performing a control to receive, by the terminal, a first control message including a channel state information reference signal (hereinafter, referred to as CSI-RS) and channel state information interference measurement (hereinafter, referred to as CSI-IM) resource configuration information from a base station; receive, from the base station, a second control message including at least one first information for a channel measurement and at least second information for an interference measurement; estimate a channel state for the base station on the basis of the first control message and the second control message; and report the channel state estimation result to the base station, wherein the first information is selected from the CSI-RS resource configuration information, and the second information is selected from the CSI-RS resource configuration information or the CSI-IM resource configuration information.

Advantageous Effects of Invention

In accordance with the embodiments of the present invention, it is possible to provide the effective feedback transmitting and receiving method and device in the mobile communication system.

In accordance with the embodiments of the present invention, the base station having a large number of transmitting antennas like the multiple active antenna array system can measure the channels for a large number of antennas or measure the channels for a large number of virtual cells. In accordance with the embodiments of the present invention, it is possible to effectively allocate the radio resources to transmit the CSI-RS from the plurality of base stations. Further, the terminal can measure the channels for a large number of transmitting antennas or the channels for a large number of cells, and configure the measured channels as the feedback information and notify the base station of the configured the feedback information.

BRIEF DESCRIPTION OF DRAWINGS

FIG. 9 is a flow chart for describing a method for configuring a channel measurement resource according to an embodiment of the present invention

MODE FOR THE INVENTION

Figure 1:
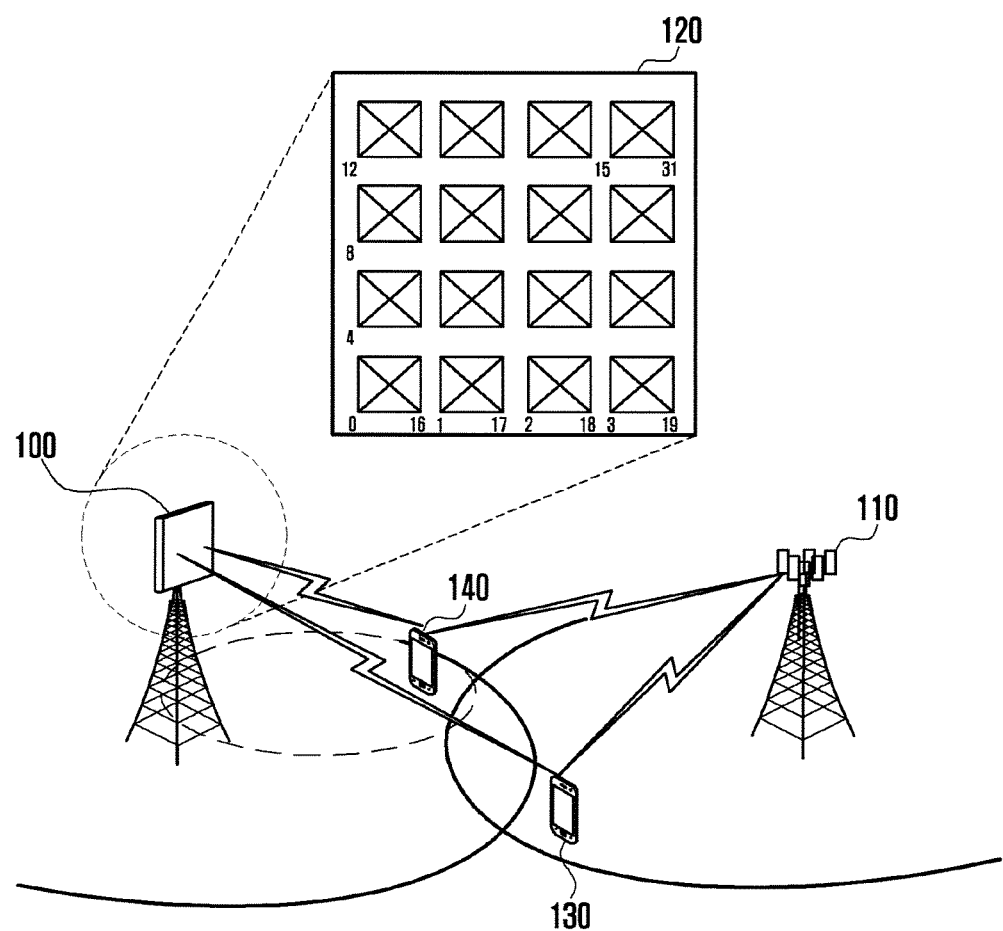
FIG. 1 is a diagram illustrating an active array antenna system.

Hereinafter, embodiments of the present invention will be described in detail with reference to the accompanying drawings. Further, when it is decided that a detailed description for the known function or configuration related to the present invention may obscure the gist of the present invention, the detailed description therefor will be omitted. Further, the following terminologies are defined in consideration of the functions in the present invention and may be construed in different ways by the intention of users and operators. Therefore, the definitions thereof should be construed based on the contents throughout the specification.

Further, in describing in detail embodiments of the present invention, an OFDM based wireless communication system, in particular, a 3GPP EUTRA standard will be described as a major target. However, a main subject of the present invention may be slightly changed to be applied to other communication systems having similar technical backgrounds and a channel type without greatly departing the scope of the present invention, which may be determined by those skilled in the art to which the present invention pertains.

Hereinafter, the present invention relates to a general wireless mobile communication system, and in particular, may be applied a wireless mobile communication system using a multiple access scheme using a multi-carrier such as an orthogonal frequency division multiple access (OFDMA). The embodiment of the present invention describes a method and an apparatus for measuring, by a terminal, a radio channel quality of signals, which is transmitted by various virtualizations, from a plurality of base stations using a plurality of active array antennas in the mobile communication system and transmitting and receiving channel state information to notify a base station of the measured results.

To achieve the above objects, a method for transmitting feedback information in a mobile communication system according to the embodiment of the present invention includes: receiving, from a base station, feedback configuration information for generating configuration information on at least one channel measurement resource consisting of at least one interference measurement resource or a combination of reference signals and feedback information on the reference signal interference measurement resource to measure an interference with at least one reference signal so as to measure a channel in up to four reference signals and up to four interference measurement resources (CSI-IM); receiving the at least one reference signal or the at least one interference measurement resource from the base station; measuring a channel based on the at least one received reference signal; measuring an interference amount in the at least one received interference measurement resource; measuring the interference channel based on the at least one reference signal; generating feedback information based on the measured result according to the feedback configuration information; and transmitting the generated feedback information to the base station.

Further, a method for receiving, by a base station, feedback information in a mobile communication system according to an embodiment of the present invention includes: transmitting, to a terminal, configuration information on at least one channel measurement resource, configuration information on at least one reference signal for at least channel measurement, and an interference measurement resource for the interference measurement and reference signal information for the interference measurement; receiving, by the terminal, a channel and interference information through the at least one reference signal and interference resource; and receiving, from the terminal, the generated feedback information based on the feedback configuration information.

Further, a terminal for transmitting feedback information in a mobile communication system includes a communication unit performing data communication with a base station; and a control unit controlling the communication unit to receive, from a base station, feedback configuration information for generating configuration information on at least one reference signal and feedback information on the at least one interference measurement resource and a reference signal for at least one interference measurement, measure the at least one received reference signal and interference measurement resource when the at least one reference signal and interference measurement resource are received from the base station, generate feedback information based on the measured results, according to the feedback configuration information, and transmit the generated feedback information to the base station.

Further, a base station for receiving feedback information in a mobile communication system includes: a communication unit performing data communication with a terminal; and a control unit controlling the communication unit to transmit, to the terminal, feedback configuration information for generating configuration information on at least one reference signal and feedback information on an interference measurement resource for the at least one interference measurement and a reference signal for interference measurement, transmit the at least two reference signals to the terminal, and receive the generated feedback information based on the feedback configuration information from the terminal.

The existing 3rd generation and fourth generation mobile communication systems such as LTE/LTE-A use a multi input multi output (hereinafter, MIMO) technology using a plurality of transmitting/receiving antennas to increase data a transmission rate and system capacity. The MIMO technology uses the plurality of transmitting/receiving antenna to spatially separate and transmit a plurality of information streams. Spatially separating and transmitting the plurality of information streams is called spatial multiplexing. Generally, the application of the spatial multiplexing to some of the information streams is changed depending on the number of antennas of the transmitter and the receiver. Generally, the application of the spatial multiplexing to some of the information streams is called a rank of the corresponding transmission. The MIMO technology supported in the standard of the LTE/LTE-A Release 11 supports the spatial multiplexing for the case in which 8 transmitting/receiving antennas are present and supports up to 8 ranks.

The multiple active antenna array system to which the technology proposed in the embodiment of the present invention that is advancement in the existing LTE/LTE-A MIMO technology is a system in which amplifiers are disposed per the plurality of antenna elements each that configure 8 antennas to be able to freely change an antenna configuration actively. For example, the multiple active antenna array system including a total of 64 antenna elements is a system that may perform a transmission to a terminal through 1 to 64 antennas using virtualization between various antenna arrays according to the configuration of the multiple active antenna array system.

According to the embodiment of the present invention, the multiple active antenna array system may be defined as a wireless communication system in which tens of or more active antenna elements are used to configure antennas so as to perform a transmission.

FIG. 1 is a diagram illustrating a multiple active antenna array system.

In FIG. 1, a base station transmitting equipment 100 transmits wireless signals to tens of or more transmitting antennas. A plurality of transmitting antennas 120 may be disposed to maintain a predetermined distance from each other, as illustrated in FIG. 1. An example of the predetermined distance may correspond to a multiple of a half of wavelength of a transmitted radio signal. Generally, when the distance is maintained at a distance which is a multiple of a half of the wavelength length of the wireless signal between the transmitting antennas, the signals transmitted from the respective transmitting antennas are affected by a radio channel having low mutual correlation.

In FIG. 1, tens of or more transmitting antennas disposed in the base station transmitting equipment 100 are used to transmit signals to one or a plurality of a terminals 140. Proper precoding is applied to the plurality of transmitting antennas to simultaneously transmit signals to the plurality of terminals. In this case, one terminal may receive more than one information stream. Generally, the number of information streams that may be received by one a terminal is determined depending on the number of receiving antennas held by the terminal and the channel conditions.

Further, in FIG. 1, terminals 140 and 130 may simultaneously or alternately receive the information streams from at least one of base stations 100 and 110, which is called a coordinate and multi point transmission. In this case, the terminal may receive the information stream through at least one multiple active antenna array system base station or may receive the information stream in a hybrid form of the multiple active antenna array system base station and a multiple passive antenna array system base station.

To effectively implement the at least one multiple active antenna array system, the terminal accurately measures at least one channel condition and a size of interference and needs to effectively transmit the channel state information to the base station using the measured channel condition and the measured size of interference. The base station receiving the channel state information determines to which terminals the transmission is performed in connection with the transmission of the downlink, at which data transmission rate the transmission is performed, what precoding is applied, or the like, by using the measured channel condition and the measured size of interference. In the case of the multiple active antenna array system, since the number of transmitting antennas are many, when the method for transmitting and receiving channel state information of the existing LTE/LTE-A system is applied, an uplink overhead problem of transmitting a lot of control information to the uplink occurs and when there is at least one base station, the overhead more greatly occurs.

In the mobile communication system, time, frequency, and power resources are limited. Therefore, when more resources are allocated to the reference signal, resources that may be allocated for the traffic channel (data traffic channel) transmission are reduced and an absolute amount of transmitted data may be reduced accordingly. In this case, the performance of channel measurement and estimation is improved but the absolute amount of transmitted data is reduced and therefore the whole system capacity performance may be reduced rather.

Therefore, to induce the optimal performance in the whole system capacity aspect, there is a need to properly distribute a resource for a reference signal for effectively performing a channel feedback and a signal resource for traffic channel transmission.

Figure 2:
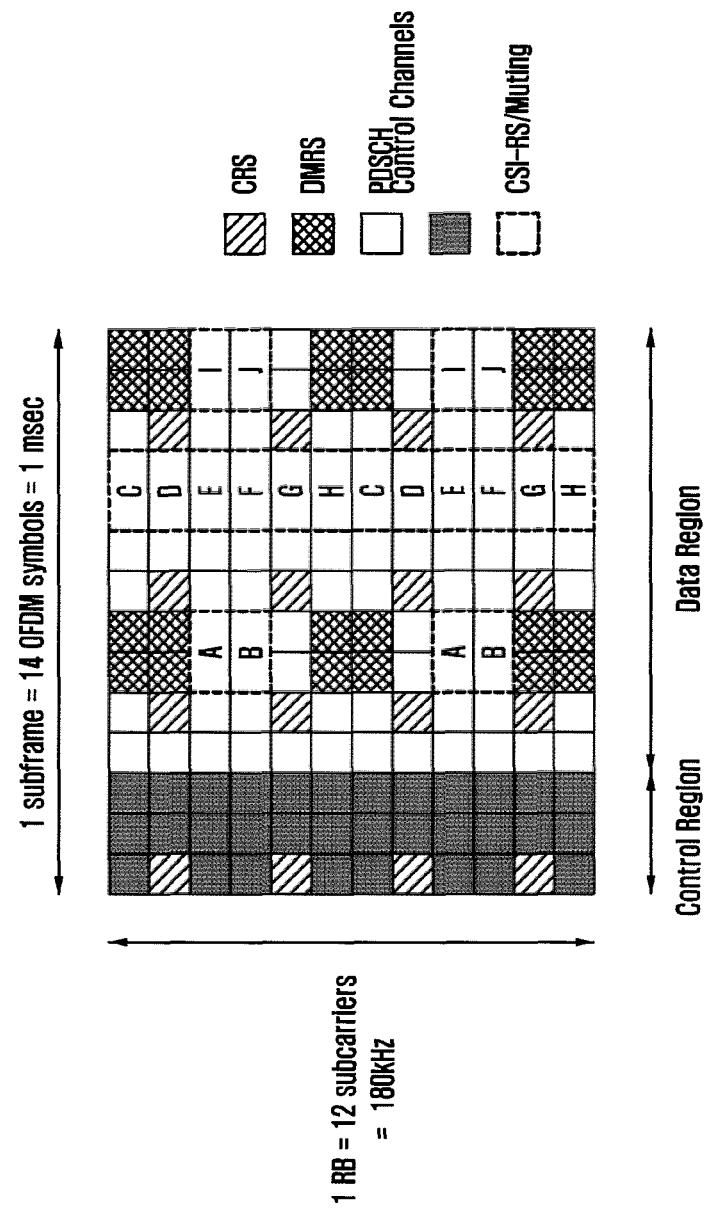
FIG. 2 is a diagram illustrating radio resources consisting of 1 subframe and 1 resource block (RB) that are a minimum unit that may be scheduled to a downlink in an LTE/LTE-A system.

FIG. 2 is a diagram illustrating radio resources consisting of 1 subframe and 1 resource block (RB) that are a minimum unit that may be scheduled to a downlink in an LTE/LTE-A system.

The radio resource illustrated in FIG. 2 consists of one subframe on a time base and consists of one resource block (RB) on a frequency base. The radio resource consists of 12 subcarriers in a frequency domain and 14 OFDM symbols in a time domain and thus has a total of 168 natural frequencies and time positions. In the LTE/LTE-A, the natural frequency and the time position of FIG. 2 are each called a resource element (RE).

In the radio resource illustrated in FIG. 2, a plurality of different kinds of signals may be transmitted as follows.

1. Cell specific reference signal (CRS) (or common reference signal): Reference signal periodically transmitted for all terminals belonging to one cell and commonly used in the plurality of terminals.

2. Demodulation reference signal (DMRS): Reference signal transmitted for a specific terminal and transmitted only when data are transmitted to the corresponding terminal. The DMRS may be configured of a total of 8 DMRS ports. In the LTE/LTE-A, port 7 to 14 correspond to a DMRS port and the ports use CDM or FDM to maintain orthogonality to prevent mutual interference from occurring.

3. Physical downlink shared channel (PDSCH): Used to transmit traffic from the base station to the terminal through the data channel transmitted to the downlink and transmitted using the RE to which the reference signal is not transmitted in the data region of FIG. 2.

4. Channel state information reference signal (CSI-RS): Reference signal transmitted for terminals belonging to one cell and used to measure the channel state. A plurality of CSI-RSs may be transmitted to one cell.

Other control channels (physical hybrid ARQ indicator channel (PHICH), physical control format indicator channel (PCFICH), physical downlink control channel (PDCCH)): Terminal used to provide control information required to receive PDSCH or transmit ACK/NACK for operating HARQ for data transmission of an uplink In addition to the signal, in the LTE-A system, muting may be set so that the CSI-RS transmitted from other base stations may be received by the terminals of the corresponding cell without interference. The muting may be applied at a part where the CSI-RS may be transmitted and generally, the terminal skips the corresponding radio resource to receive the traffic signal. In the LTE-A system, the muting is called zero-power CSI-RS as another term. The reason is that the muting is identically applied to the position of the CSI-RS in characteristics of the muting and the transmission power is not transmitted.

In FIG. 2, the CSI-RS may be transmitted using some of positions represented by A, B, C, D, E, E, F, G, H, I, and J depending on the number of antennas transmitting the CSI-RS. Further, the muting may also be applied to some of the positions represented by A, B, C, D, E, E, F, G, H, I, and J. In particular, the CSI-RS may be transmitted to 2, 4, and 8 REs depending on the number of transmitted antenna ports. When the number of antenna ports is two, in FIG. 2, the CSI-RS is transmitted using a half of a specific pattern. When the number of antenna ports is 4, the CSI-RS is transmitted using all the specific patterns and when the number of antenna ports is 8, the CSI-RS is transmitted using two patterns.

On the other hand, the muting is configured in one pattern unit all the time. That is, the muting may be applied to the plurality of patterns but when the positions of the CSI-RS do not overlap each other, may not be applied only to a part of one pattern. However, the muting may be applied only to a part of one pattern as long as the position of the CSI-RS and the position of the muting overlap with each other.

When the CSI-RS is transmitted to 2 antenna ports, the CSI-RS transmits the signals of each antenna port from the two REs connected on the time base and the signals of each antenna port are divided as an orthogonal code. Further, when the CSI-RS for 4 antenna ports is transmitted, the signals of the remaining two antenna ports are transmitted to the CSI-RS for two antenna ports by the same method additionally using two REs. The same goes for the case in which the CSI-RS for 8 antenna ports is transmitted.

Further, the terminal may be allocated channel state information interference measurement information CSI-IM (or interference measurement resources (IMR)) along with the CSI-RS and the resource of the CSI-IM has the same resource structure and position as the CSI-RS supporting the 4 port. The CSI-IM is a resource for allowing the terminal receiving data from at least base station to accurately measuring the interference between adjacent base stations. For example, when the user wants to measure an interference amount when adjacent base stations transmit data and an interference amount when the adjacent bas stations do not transmit data, the base station configures the CSI-RS and two CSI-IM resources. The base station may effectively measure the interference amount of the adjacent base stations so that one CSI-IM is configured to allow adjacent base stations to transmit signals at all times and the other CSI-IM is configured to allow adjacent base stations not to transmit signals at all times.

In the cellular system, the base station needs to transmit the reference signal to the terminal for measuring the downlink channel state. In the long term evolution advanced (LTE-A) system of the 3GPP, the terminal uses the CRS or the channel state information reference signal (CSI-RS) transmitted from the base station to measure the channel state between the base station and the terminal. The channel state needs to basically consider some elements and includes an interference amount in the downlink. The interference amount in the downlink includes an interference signal, thermal noise, or the like that occurs by the antenna belonging to the adjacent base stations, which is important for the terminal to determine the channel condition.

As an example, when a signal is transmitted from the base station having one transmitting antenna to the terminal having one receiving antenna, the terminal uses the reference signal received by the base station to determine the interference amounts simultaneously received in a section in which energy per symbol received by the downlink and the corresponding symbol are received, thereby determining Es/Io. The determined Es/Io is converted into the data rate or the corresponding value and is notified to the base station in a channel quality indicator (CQI) form, such that the base station may determine at what data rate the transmission to the terminal is performed in the downlink.

In the case of the LTE-A system, the terminal may feedback the information on the channel state of the downlink to the base station to be used in the downlink scheduling of the base station. That is, the terminal measures the reference signal transmitted from the base station to the downlink and feedbacks the extracted information to the base station in the form defined in the LTE/LTE-A standard. In the LTE/LTE-A, the information fed back by the terminal is largely three as follows.

Rank indicator (RI): The number of spatial layers that may be received by the terminal in the current channel state.

Precoder matrix indicator (PMI): Indicator for a precoding matrix preferred in the current channel state by the terminal.

Channel quality indicator (CQI): Maximum data rate that may be received in the current channel state by the terminal. The CQI may be replaced by a signal-to-interference-plus-noise ratio (SINR) that may be similarly used to the maximum data rate, a maximum error correction code rate and a modulation scheme, data efficiency per frequency, or the like.

The rank indicator (RI), the procoder matrix indicator (PMI), and the channel quality indicator (CQI) have a meaning when they are associated with each other. As one example, the precoding matrix supported in the LTE/LTE-A is differently defined by each rank. For this reason, even though the PMI value when the RI has a value of 1 and the PMI value when the RI is a value of 2 are the same, they are analyzed differently. Further, it is assumed that the rank value and the PMI value notified to the base station by the terminal are applied to the base station even when the terminal determines the CQI.

That is, when the terminal notifies the base station of RI_X, PMI_Y, and CQI_Z, when the rank is the RI_X and the precoding is the PMI_Y, the terminal may receive the data rate corresponding to the CQI_Z. As such, by assuming whether to perform any transmission scheme on the base station when the terminal calculates the CQI, the terminal may obtain the optimized performance when performing the actual transmission using the corresponding transmission scheme.

One of the following four feedback mode or reporting modes depending on whether the periodic feedback of the terminal in the LTE/LTE-A includes any information is set.
 1. Reporting mode 1-0: RI, wideband CQI (wCQI)
 2. Reporting mode 1-1: RI, wCQI, PMI
 3. Reporting mode 2-0: RI, wCQI, subband CQI (sCQI)
 4. Reporting mode 2-1: RI, wCQI, sCQI, PMI The feedback timing of each information on the four feedback mode is determined by values of $N_{pd}$, $N_{OFFSET,CQI}$, $M_{RI}$, $N_{OFFSET,RI}$, or the like that are transferred as a higher layer signal. In a feedback mode 1-0, a transmission period of wCQI is an NPD and subframe and feedback timing is determined based on a subframe offset value of $N_{OFFSET,CQI}$. Further, the transmission period of the RI is $N_{pd} \cdot M_{RI}$ and the offset is $N_{OFFSET,CQI} + N_{OFFSET,RI}$.

Figure 3:
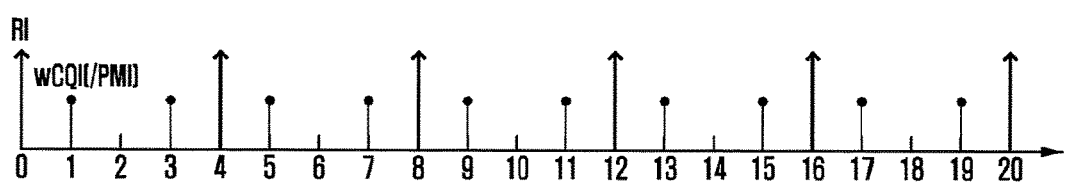
FIGS. 3 to 6 are diagrams illustrating feedback timing in the LTE/LTE-A system.

FIG. 3 is a diagram illustrating the feedback timings of the RI and the wCQI when $N_{pd}=2$, $M_{RI}=2$, $N_{OFFSET,CQI}=1$, $N_{OFFSET,RI}=-1$. In FIG. 3, each timing represents a subframe index.

The feedback mode 1-1 has the same feedback timing as the mode 1-0 but is different from the mode 1-0 in that the wCQI and the PMI are transmitted together at wCQI transmission timing.

In the feedback mode 2-0, a feedback period of sCQI is $N_{pd}$ and an offset value thereof is $N_{OFFSET,CQI}$. Further, the feedback period of the wCQI is an $H \cdot N_{pd}$ and an offset value thereof is $N_{OFFSET,CQI}$ like the offset value of the sCQI. Here, $H=J \cdot K+1$, in which K is transferred as the higher signal and J is a value determined depending on the system bandwidth. For example, the J value for a 10 MHz system is defined as 3. Consequently, the wCQI is transmitted by being replaced once whenever the sCQI is transmitted H times. Further, the period of RI is a $M_{RI} \cdot H \cdot N_{pd}$ and an offset thereof is $N_{OFFSET,CQI} + N_{OFFSET,RI}$.

Figure 4:
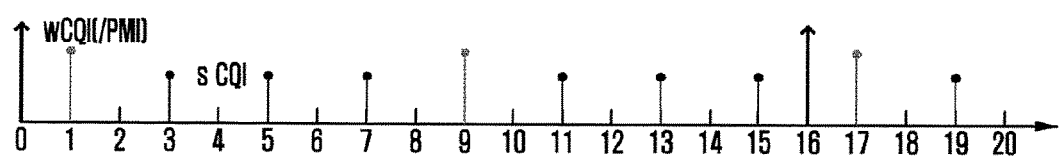

FIG. 4 is a diagram illustrating the feedback timings of the RI, the sCQI, and the wCQI when $N_{pd}=2$, $M_{RI}=2$, J=3 (10 MHz), K=1, $N_{OFFSET,CQI}=1$, $N_{OFFSET,RI}=-1$. The feedback mode 2-1 has the same feedback timing as the mode 2-0 but is different from the mode 1-0 in that the wCQI and the PMI are transmitted together at wCQI transmission timing.

The above-mentioned feedback timings corresponds to the case in which the number of CSI-RS antenna ports is equal to or less four. In the case of the terminal to which the CSI-RS for 9 antenna ports is allocated, unlike the feedback timing, two PMI information need to be feedback. For the 8 CSI-RS antenna ports, the feedback mode 1-1 is divided into two submodes, in which in the first submode, the RI is transmitted together with first PMI information and second PMI information is transmitted together with the wCQI. Here, the feedback period and the offset of the wCQI and the second PMI are defined as $N_{pd}$ and $N_{OFFSET,CQI}$ and the feedback period and the offset value of the RI and the first PMI information are each defined as $M_{RI} \cdot H \cdot N_{pd}$ and $N_{OFFSET,CQI} + N_{OFFSET,RI}$. Here, if the precoding matrix corresponding to the first PMI is called $W_1$ and the precoding matrix corresponding to the second PMI is $W_2$, the terminal and the base station share the information that the precoding matrix that the terminal prefers is determined as $W_1 W_2$.

When the feedback mode for the 8 CSI-RS antenna ports is 2-1, precoding type indicator (PTI) information is added to the feedback information. In this case, the PTI is fed back together with the RI and a period thereof is an $M_{RI} \cdot H \cdot N_{pd}$ and an offset thereof is defined as $N_{OFFSET,CQI} + N_{OFFSET,RI}$.

In detail, when the PTI is 0, the first PMI, the second PMI, and the wCQI all are fed back. In this case, the wCQI and the second PMI are transmitted together at the same timing and the periods thereof are $N_{pd}$ and the offsets thereof are given as $N_{OFFSET,CQI}$. The period of the first PMI is $H' \cdot N_{pd}$ and the offset thereof is $N_{OFFSET,CQI}$. Here, H' is transmitted as a higher layer signal.

On the other hand, when the PTI is 1, the PTI is transmitted along with the RI. In this case, the wCQI and the second PMI are transmitted together and the sCQI is additionally feedback at separate timing. In this case, the first PMI is not transmitted. The period and the offset of the PTI and the RI correspond to the case in which the PTI is 0. The period of the sCQI is defined as $N_{pd}$ and the offset thereof is defined as $N_{OFFSET,CQI}$. The wCQI and the second PMI are fed back having the period of the $H \cdot N_{pd}$ and the offset of the $N_{OFFSET,CQI}$ and the H is defined like the case in which the number of CSI-RS antenna ports is 4.

Figure 5:
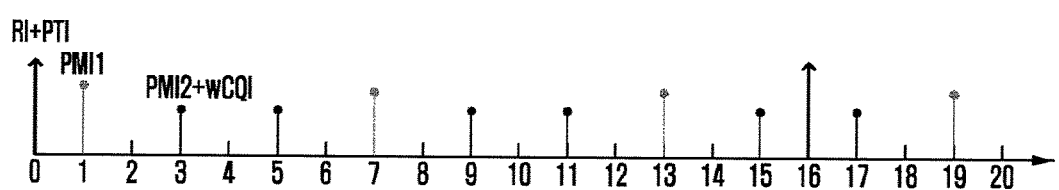
Figure 6:
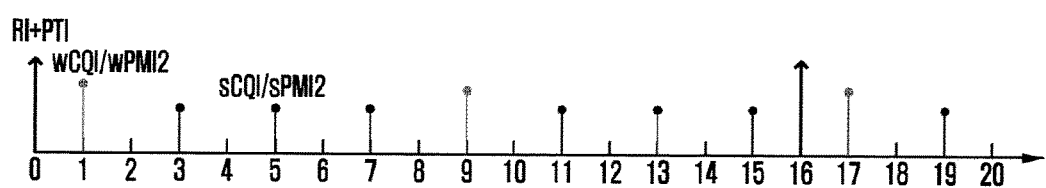

FIGS. 5 and 6 are diagrams illustrating feedback timing in the case of PTI=0 and PTI=1 for the case in which $N_{pd}=2$, $M_{RI}=2$, J=3 (10 MHz), K=1, H'=3, $N_{OFFSET,CQI}=1$, $N_{OFFSET,RI}=-1$.

Generally, like the multiple active antenna array system, when the number of transmitting antennas is many, the CSI-RS in proportion to the number of transmitting antennas needs to be transmitted. For example, when 8 transmitting antennas are used in the LTE/LTE-A, the base station transmits the CSI-RS corresponding to 8-port to the terminal to measure the downlink channel state. In this case, radio resources configured of 8 REs represented by A and B of FIG. 2 need to be used within one RB to transmit the CSI-RS corresponding to the 8-port from the base station. When the CSI-RS transmission of the LTE/LTE-A scheme is applied to the multiple active antenna array system, the radio resource in proportion to the number of transmitting antennas needs to be allocated to the CSI-RS.

Further, the multiple active antenna array system may create at least one virtual cell by allowing one base station to use a combination of different active array antennas. In this case, the terminal needs to receive a data channel from at least one possible base station, not from the at least one base station. In this case, the terminal requires more resources when measuring the channel of the active antenna array system. The CSI-RS transmission scheme requires excessive radio resources, and therefore has a contrary effect of reducing radio resources required for transmission and reception of radio data.

The embodiment of the present invention is a method for effectively allocating resources to allow a base station having a large number of transmitting antennas like a multiple active antenna array system to transmit CSI-RS and performing, by a terminal, channel measurement for interference as well as channel measurement for a large number of transmitting antennas or channel measurement for a large number of cells.

The terminal may configure a channel measurement process using at least one CSI-RS resource and at least one CSI-IM. The technology proposed in the embodiment of the present invention is a method for allocating up to four CSI-RSs and up to four CSI-IMs as channel measurement resources to one terminal and configuring a resource measurement process as a combination of up to three channel measurement resources among the channel measurement resources. Meanwhile, the LTE standard (Rel-11) may support three CSI-RS resources at present. The embodiment of the present invention may use four CSI-RS resources and four CSI-IM resources for a combination of additional channel measurement resources.

By the above-mentioned principle, according to the configuration of the channel measurement process transmitted from the base station to the terminal, a first CSI-IM may be configured for a channel measurement of a self cell and for an interference measurement with a first CSI-RS and a second CSI-RS. As another configuration, a first CSI-IM and a second CSI-IM may be configured for the channel measurement of the self cell and the interference measurement with the first CSI-RS. As another configuration, the first CSI-IM may be configured for the channel measurement of the self cell and the interference measurement with the first CSI-RS and the second CSI-RS may be configured for interference channel measurement. According to the embodiment of the present invention, by the configuration, a large number of antenna channels may be measured using at least one CSI-RS or by the above configuration, different kinds of beams generated by the multiple active antenna and various kinds of interference amounts and channels may also be measured.

Figure 7:
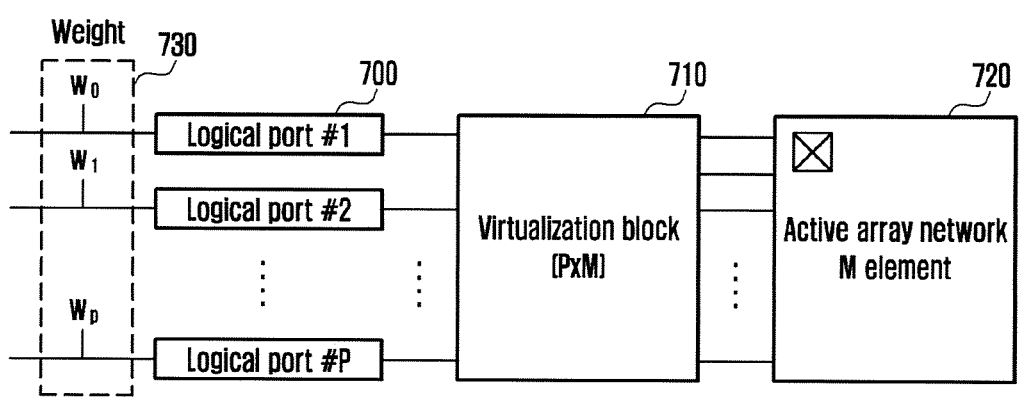
FIG. 7 is a diagram illustrating an antennal virtualization method for a multiple active antenna array system according to an embodiment of the present invention.

FIG. 7 is a diagram illustrating an antennal virtualization method for a multiple active antenna array system according to an embodiment of the present invention.

Referring to FIG. 7, the base station operating the multiple active array antenna according to the embodiment of the present invention is configured of a total M of active array antennas. As the detailed example, the case in which, for example, 32 active array antennas 120 as illustrated in FIG. 1 are arrayed two dimensionally will be described. Among those, 16 antennas 0 to 15 are disposed having an angle of −45° with respect to a positive direction of an X axis and the rest 16 antennas 16 to 31 are disposed having an angle of +45° with respect to the positive direction of the X axis. As described above, the antenna shape in which N/2 antennas among a total N of antennas and the rest N/2 antennas are disposed at the same position, having an angle of 90° is called a cross polarization (XPOL). The XPOL is used to obtain a large antenna gain by disposing several antennas in a small space.

The XPOL has the feature that N/2 first antenna groups and the rest N/2 second antenna groups that have the same direction are disposed at the same position, and therefore radio channels formed by each group have only a simple phase difference. That is, if when N is defined as the number of receiving antennas of the terminal, a channel matrix having a size of $N_{RX} \times 16$ for the first antenna group and the terminal is $H_1$, a channel matrix $H_2$ for the second antenna group and the terminal may be represented by a scalar product of $H_1$ like the following Equation 1.

$$H_2 = e^{j\phi} H_1 \quad \text{[Equation 1]}$$

In the above Equation 1, component (i, j) of $H_k$ represents a channel value from a j-th transmitting antenna within a k-th antenna group to an i-th receiving antenna.

In FIG. 7, M antennas may adjust the number (P) of channels and the number (M) of active antennas, which are shown in the actual terminal, by various virtualizations. The reason is that the active antenna has amplifiers per antenna unlike the existing passive antenna and thus there is more freedom of mixture with and separation from each other between antennas. For example, physical antenna elements 700 actually held by the base station are called a physical antenna port and a resource indicated by allowing the base station to configure the CSI-RS resource in the terminal to perform the channel measurement may be called a logical antenna port. In this case, the active antenna array base station may have a total M of physical antenna ports and a total of P logical antenna ports. Further, a virtualization apparatus 710 for virtualization is present between the total of P logical antenna ports and the total of M physical antenna ports. The number of antenna ports actually shown in the terminal by the virtualization apparatus is defined, which is mapped to the CSI-RS resource and transmitted. The channel between the physical antenna port and the terminal may be represented by H as the following Equation 2.

$$H = [H_1, H_1] = [H_1 e^{j\phi} H_1]. \quad \text{[Equation 2]}$$

In the above Equation 2, H represents a matrix having a size of $N_{Rx} \times M$. At this point, if the relationship between the logical antenna port and the physical antenna port for virtualization is Q, this becomes a matrix having a size of M×P and the channel that the terminal receives may be represented by $\bar{H}$ as the following Equation 3.

$$\bar{H} = HQ \quad \text{[Equation 3]}$$

In the above Equation 3, $\bar{H}$ becomes the matrix having a size of $N_{Rx} \times M$, such that the terminal configures the CSI-RS resource for the P port and measures the channel therefore. Here, the precoding for optimal beam selection of the terminal is performed on the logical antenna port like 730. If the rank of the precoder is R and the precoder is P, the P becomes a matrix having a size of P×R and a channel $\hat{H}$ to which the precoder received by the terminal may be represented by the following Equation 4.

$$\hat{H} = \bar{H}P = HQ\,P \quad \text{[Equation 4]}$$

For the terminal to effectively measure the channel, the virtualization Q for the CSI-RS needs to be configured to be little changed and the precoder P therefore may be continuously changed to follow up the channel dynamically changed.

First Embodiment

Figure 8:
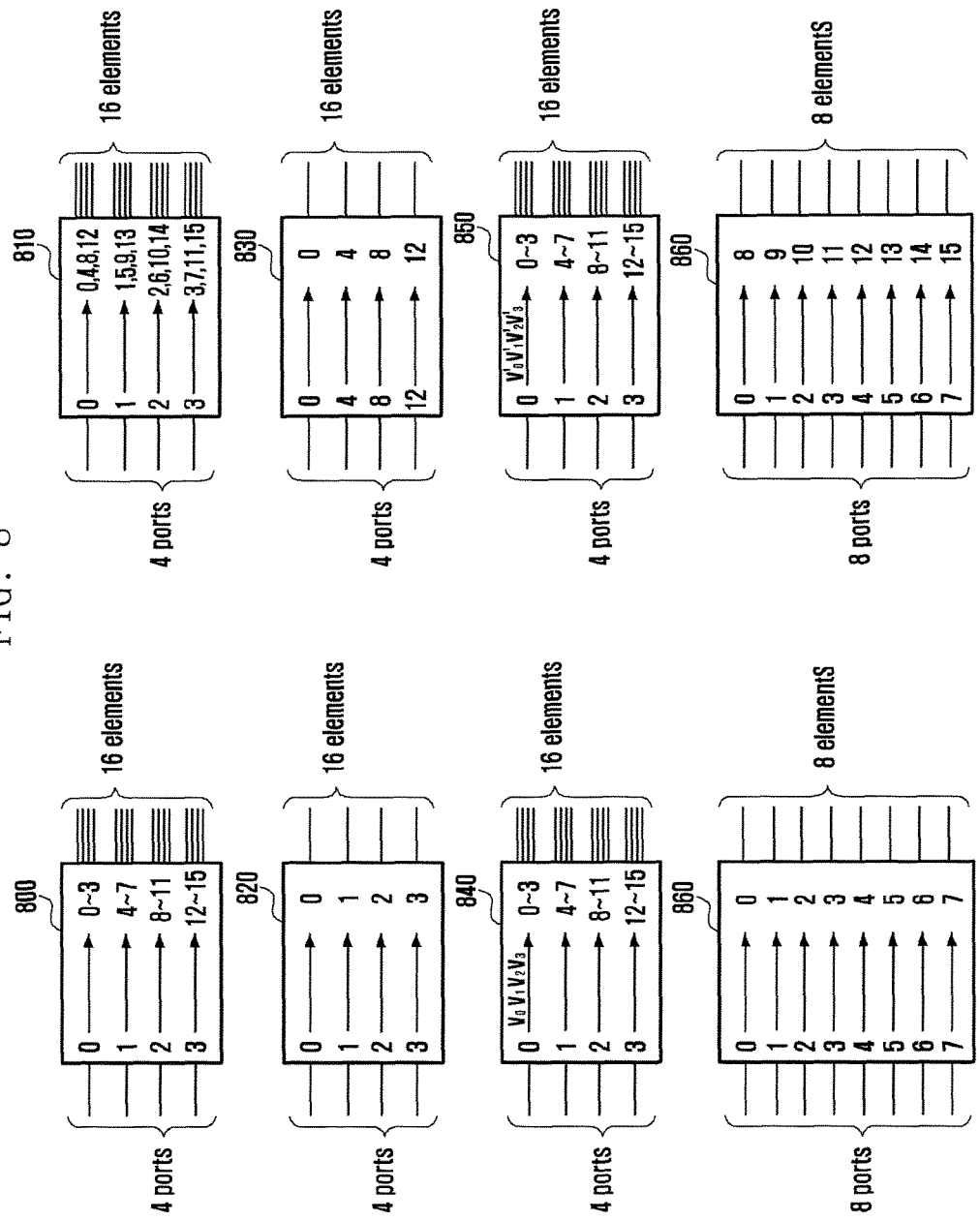
FIG. 8 is a diagram illustrating various virtualization methods according to an embodiment of the present invention.

FIG. 8 illustrates various virtualization methods according to an embodiment of the present invention. The multiple active antenna array system may use various virtualizations to meet the cell environment. Referring to FIG. 8, FIG. 8 illustrates a method for using a total of physical antenna ports. Reference numeral 800 represents an example in which P is 4 and M is 16 and Q may be represented by the following Equation 5.

$$Q = \begin{bmatrix} a_{1,1} & 0 & 0 & 0 \\ a_{1,2} & 0 & 0 & 0 \\ a_{1,3} & 0 & 0 & 0 \\ a_{1,4} & 0 & 0 & 0 \\ 0 & a_{2,5} & 0 & 0 \\ 0 & a_{2,6} & 0 & 0 \\ 0 & a_{2,7} & 0 & 0 \\ 0 & a_{2,8} & 0 & 0 \\ 0 & 0 & a_{2,9} & 0 \\ 0 & 0 & a_{2,10} & 0 \\ 0 & 0 & a_{2,11} & 0 \\ 0 & 0 & a_{2,12} & 0 \\ 0 & 0 & 0 & a_{3,13} \\ 0 & 0 & 0 & a_{3,14} \\ 0 & 0 & 0 & a_{3,15} \\ 0 & 0 & 0 & a_{3,16} \end{bmatrix} \quad \text{[Equation 5]}$$

In the above Equation 5, $\alpha_{i,j}$ represents the relationship applied to the i-th logical antenna port and the j-th physical antenna port and generally has the relationship of $\alpha_{1,1+n} = \alpha_{2,5+n} = \alpha_{3,9+n} = \alpha_{4,12+n}$ (n=0, 1, 2, and 3). This is to maintain the virtualization of the same configuration between the physical antennas to which the respective antenna port is transmitted. Further, when the virtualization is performed by the above-mentioned structure, one logical antenna port transmits a signal using a total of four physical antenna ports. A signal is transmitted through $\alpha_{i,j}$ that is weight values applied to the respective physical antenna ports and as illustrated in reference numeral 800, one logical antenna port is transmitted through four physical antenna ports horizontally disposed. When a total of four logical antenna ports are used, the base station configures 4 port CSI-RS in the terminal to measure the channel for four ports and since the physical antenna ports to which one logical antenna port is transmitted are horizontally disposed, the logical antenna port may be transmitted using antenna virtualization vertically diffused.

When the antenna virtualization vertically diffused is transmitted through the port of the portion for the CSI-RS, the terminal may receive the corresponding virtualized channel and acquire the channel information for vertically simultaneous transmission between the terminals through the feedback rank indicator (RI), the precoder matrix indicator (PMI), and the channel quality indicator (CQI).

Second Embodiment

Reference numeral 810 represents an example in which P is 4 and M is 16 and Q may be represented by the following Equation 6.

$$Q = \begin{bmatrix} a_{1,1} & 0 & 0 & 0 \\ 0 & a_{2,2} & 0 & 0 \\ 0 & 0 & a_{3,3} & 0 \\ 0 & 0 & 0 & a_{4,4} \\ a_{1,5} & 0 & 0 & 0 \\ 0 & a_{2,6} & 0 & 0 \\ 0 & 0 & a_{3,7} & 0 \\ 0 & 0 & 0 & a_{4,8} \\ a_{1,9} & 0 & 0 & 0 \\ 0 & a_{2,10} & 0 & 0 \\ 0 & 0 & a_{3,11} & 0 \\ 0 & 0 & 0 & a_{4,12} \\ a_{1,12} & 0 & 0 & 0 \\ 0 & a_{213} & 0 & 0 \\ 0 & 0 & a_{3,14} & 0 \\ 0 & 0 & 0 & a_{4,15} \end{bmatrix}$$ [Equation 6]

In the above Equation 6, $\alpha_{i,j}$ represents the relationship applied to the i-th logical antenna port and the j-th physical antenna port and generally has the relationship of $\alpha_{1,1+n} = \alpha_{2,2+n} = \alpha_{3,3+n} = \alpha_{4,4+n}$ (n=0, 4, 7, and 11). This is to maintain the virtualization of the same configuration between the physical antennas to which the respective antenna port is transmitted. Further, when the virtualization is performed by the above-mentioned structure, one logical antenna port transmits a signal using a total of four physical antenna ports. A signal is transmitted through the that is the weight values applied to the respective physical antenna ports is transmitted. As illustrated in reference numeral 800, one logical antenna port is transmitted through four physical antenna ports vertically disposed. When a total of four logical antenna ports are used, the base station configures 4 port CSI-RS in the terminal to measure the channel for four ports and since the physical antenna ports to which one logical antenna port is transmitted are vertically disposed, the logical antenna port may be transmitted using antenna virtualization horizontally diffused.

Using the virtualization method of reference numeral 800 and reference numeral 810, the base station transmits the vertically diffused channel and the horizontally diffused channel to the terminal and may receive the channel measurement information therefore. As a result, the base station may receive the terminal feedback for multi user MIMO transmission between terminals horizontally positioned or multi user MIMO between terminals horizontally positioned.

Third Embodiment

Reference numeral 820 and Reference numeral 830 illustrate an example in which P is 16 and M is 16 and $Q_1$ and $Q_2$ for reference numeral 820 and reference numeral 830, respectively, may be represented by the following Equation 7.

$$Q_1 = \begin{bmatrix} a_{1,1} & 0 & 0 & 0 & \cdots & 0 \\ 0 & a_{2,2} & 0 & 0 & \cdots & 0 \\ 0 & 0 & a_{3,3} & 0 & \cdots & 0 \\ 0 & 0 & 0 & a_{4,4} & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \end{bmatrix}$$ [Equation 7]

$$Q_2 = \begin{bmatrix} a_{1,1} & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & 0 \\ 0 & 0 & a_{5,5} & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & a_{8,8} & \cdots & 0 \\ 0 & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & a_{13,13} \\ 0 & 0 & 0 & 0 & \cdots & 0 & \cdots & 0 \\ 0 & 0 & 0 & 0 & \cdots & 0 & \cdots & 0 \\ 0 & 0 & 0 & 0 & \cdots & 0 & \cdots & 0 \end{bmatrix}$$

In the above Equation 7, $\alpha_{i,j}$ represents the relationship applied to the i-th logical antenna port and the j-th physical antenna port. The structure corresponds to the case in which the logical antenna port and the physical antenna port are virtualized one to one. In this case, the terminal may substantially map the logical antenna port corresponding to 0, 1, 2, and 3 ($N_H$=4) to 4 port CSI-RS-1 and map the logical antenna port corresponding to 0, 4, 8, and 12 ($N_V$=4) to additional 4 port CSI-RS-2, thereby measuring the channel. For example, if a $N_{Rx} \times N_H$ channel matrix estimated by the terminal using the CSI-RS-1 is $$H_H = \begin{bmatrix} h_1^{(H)} \\ \vdots \\ h_{N_{Rx}}^{(H)} \end{bmatrix}$$

and, a $N_{Rx} \times N_V$ channel matrix estimated by the terminal using the CSI-RS-2 is $$H_V = \begin{bmatrix} h_1^{(V)} \\ \vdots \\ h_{N_{Rx}}^{(V)} \end{bmatrix},$$

a $N_{Rx} \times (N_{HN_F})$ channel matrix for $N=N_H N_V$ two-dimensional transmitting antennas may be represented by the following Equation 8.

$$H = H_{HV} = \gamma \begin{bmatrix} h_1^{(H)} \otimes h_1^{(V)} \\ \vdots \\ h_{N_{Rx}}^{(V)} \otimes h_{N_{Rx}}^{(V)} \end{bmatrix} \quad \text{[Equation 8]}$$

In the above Equation 15, γ is a scalar value required to change an effect due to the antenna virtualization per horizontal and vertical antenna to channel values for all the two-dimensional antennas. The γ may separately be notified from the base station and may also be previously calculated in the channel estimation condition of the CSI-RS to have a value of 1. Further, ⊗ represents a Kronecker product of a matrix and the Kronecker product between the matrices A and B is represented by the following Equation 9.

$$A \otimes B = \begin{bmatrix} a_{11}B & \cdots & a_{1n}B \\ \vdots & \ddots & \vdots \\ a_{m1}B & \cdots & a_{mn}B \end{bmatrix} \quad \text{[Equation 9]}$$

In the above Equation 9, $$A = \begin{bmatrix} a_{11} & \cdots & a_{1n} \\ \vdots & \ddots & \vdots \\ a_{m1} & \cdots & a_{mn} \end{bmatrix}.$$

The above Equation 9 describes the case in which the number of CSI-RS antenna ports in the horizontal and vertical directions is $N_H$ and $N_V$. This is the virtualization method for making the channel between the $N=N_H N_V$ base station antennas having a two-dimensional array and $N_{Rx}$ receiving antennas equal to the channel formed by a separate Kronecker product per receiving antenna for the vertical and horizontal channels estimated from the respective CSI-RS in the vertical and horizontal directions.

This is the virtualization method for representing the equivalence to the channel formed by the actual Kronecker product by measuring only NH+NV antenna ports measured by the terminal among the M logical antenna ports.

This is the virtualization method for reducing the number of channels to be measured among the M logical antenna ports and acquiring, by the terminal, all the channels for the two-dimensional antenna array. The embodiment is a technology of performing spatial multiplexing transmission using an antenna array in a two-dimensional space when the base station receives the RI, the PMI, and the CQI from the terminal.

Fourth Embodiment

Reference numeral 840 and reference numeral 850 represent an example in which P is 4 and M is 16. For each $Q_1$ and $Q_2$, $Q_1$ may be represented by the above Equation 5 and the virtualization corresponding to $Q_2$ may be represented by the following Equation 10.

$$Q = \begin{bmatrix} \beta_{1,1} & 0 & 0 & 0 \\ \beta_{1,2} & 0 & 0 & 0 \\ \beta_{1,3} & 0 & 0 & 0 \\ \beta_{1,4} & 0 & 0 & 0 \\ 0 & \beta_{2,5} & 0 & 0 \\ 0 & \beta_{2,6} & 0 & 0 \\ 0 & \beta_{2,7} & 0 & 0 \\ 0 & \beta_{2,8} & 0 & 0 \\ 0 & 0 & \beta_{2,9} & 0 \\ 0 & 0 & \beta_{2,10} & 0 \\ 0 & 0 & \beta_{2,11} & 0 \\ 0 & 0 & \beta_{2,12} & 0 \\ 0 & 0 & 0 & \beta_{3,13} \\ 0 & 0 & 0 & \beta_{3,14} \\ 0 & 0 & 0 & \beta_{3,15} \\ 0 & 0 & 0 & \beta_{3,16} \end{bmatrix} \quad \text{[Equation 10]}$$

In the above Equation 10, $\beta_{i,j}$ represents the relationship applied to the i-th logical antenna port and the j-th physical antenna port.

Generally, this has the relationship of $\beta_{1,1+n} = \beta_{2,5+n} = \beta_{3,9+n} = \beta_{4,12+n}$ (n=0, 1, 2, and 3). This has the relationship of $\alpha_{i,j} \neq \beta_{i,j}$. This is to allow the terminal to apply different virtualizations between the respective logical antenna ports while maintaining the virtualization of the same configuration between the physical antennas to which the respective logical antenna ports are transmitted. Further, when the virtualization is performed by the above-mentioned structure, one logical antenna port 840 transmits a signal using a total of four physical antenna ports. A signal is transmitted through the $\alpha_{i,j}$ that is the weight values applied to the respective physical antenna ports is transmitted. The one logical antenna port 850 transmits a signal using a total of four physical antenna ports. A signal is transmitted through the $\beta_{i,j}$ that is the weight values applied to the respective physical antenna ports is transmitted. That is, even if the physical antenna ports used to apply the virtualization for the physical antenna port to the logical antenna port are the same, the base station may use different weights to apply other virtualizations. In this case, the virtualization 840 is transmitted to the terminal through the 4 port CSI-RS and the virtualization 850 is additionally transmitted to the terminal through the 4 port CSI-RS, such that the feedback may be made using the same virtualization using different weight values.

The foregoing method is a method for configuring a virtual cell within a cell and the base station uses the mapping of the same logical antenna port and the same physical antenna port but may differently apply the weights used for the port mapping. In this case, the actually configured signal indicates different directions spatially and may obtain an effect as if two cells are present. At this point, the base station transmits different two virtualizations to the terminal by mapping the virtualizations to different two CSI-RS ports. The terminal generates the RI, the PMI, and the CQI from the two CSI-RSs and feedbacks the generated RI, PMI, and CQI to the base station. This is a technology of operating the base station as if the terminal performs the feedback to the two cells.

Fifth Embodiment

Reference numeral 860 illustrate an example in which P is 16 and M is 16 and $Q_1$ and $Q_2$ for reference numeral 820 and reference numeral 830, respectively, may be represented by the following Equation 7.

$$Q_1 = \begin{bmatrix} a_{1,1} & 0 & 0 & 0 & \cdots & 0 \\ 0 & a_{2,2} & 0 & 0 & \cdots & 0 \\ 0 & 0 & a_{3,3} & 0 & \cdots & 0 \\ 0 & 0 & 0 & a_{4,4} & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & a_{8,8} \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \end{bmatrix} \quad \text{[Equation 11]}$$

$$Q_2 = \begin{bmatrix} 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ a_{9,9} & 0 & 0 & 0 & \cdots & 0 \\ 0 & a_{10,10} & 0 & 0 & \cdots & 0 \\ 0 & 0 & a_{11,11} & 0 & \cdots & 0 \\ 0 & 0 & 0 & a_{12,12} & \cdots & 0 \\ 0 & 0 & 0 & 0 & \cdots & 0 \\ 0 & 0 & 0 & 0 & \cdots & 0 \\ 0 & 0 & 0 & 0 & \cdots & 0 \\ 0 & 0 & 0 & 0 & \cdots & a_{16,16} \end{bmatrix}$$

In the above Equation 11, $\alpha_{i,j}$ represents the relationship applied to the i-th logical antenna port and the j-th physical antenna port. The structure corresponds to the case in which the logical antenna port and the physical antenna port are virtualized one to one. In this case, the terminal actually maps the logical antenna ports corresponding 0, 1, 2, 3, 4, 5, 6, and 7 to 8 port CSI-RS-1 and maps the logical antenna ports corresponding 8, 9, 10, 11, 12, 13, 14, and 15 to added 8 port CSI-RS-2, thereby measuring the channel. For example, if a channel matrix estimated by the terminal using the CSI-RS-1 is $$H_1 = \begin{bmatrix} h_1^{(1)} \\ \vdots \\ h_{N_{Rx}}^{(1)} \end{bmatrix}$$

and a $N_{Rx} \times N_2$ channel matrix estimated by the terminal using the CSI-RS-2 is $$H_2 = \begin{bmatrix} h_1^{(2)} \\ \vdots \\ h_{N_{Rx}}^{(2)} \end{bmatrix},$$

a $N_{Rx} \times (N_1+N_2)$ channel matrix for $N=N_1+N_2$ two-dimensional transmitting antennas may be represented by the following Equation 12.

$$\overline{H} = \begin{bmatrix} h_1^{(1)} \\ \vdots \\ h_{N_{Rx}}^{(1)} \\ h_1^{(2)} \\ \vdots \\ h_{N_{Rx}}^{(2)} \end{bmatrix} \quad \text{[Equation 12]}$$

In the above Equation 12, when the number of CSI-RS antenna ports is $N_1$ and $N_2$, a virtualization method for representing the channel between the $N=N_1+N_2$ base station antennas having the two-dimensional array and the $N_{Rx}$ receiving antennas by the channel formed for the channel estimated from the CSI-RS of reference numeral 860 is used.

The virtualization method is a method for concatenating the channels actually measured in different CSI-RSs with each other and may be used when the number of logical antenna ports is more than the maximally possible number of CSI-RS ports. By this way, the terminal may concatenate the information measured in different resources with each other to determine the channel as one channel and feedback the RI, the PMI, and the CQI.

In other words, the multiple active antenna array base station may apply a various kinds of virtualizations described above. At least one of various virtualizations is generated in one base station and at the same time, additional virtualizations may be generated in adjacent base stations. The embodiment of the present invention propose the following method for configuring a channel measurement resource to allow the multiple active antenna array base station to channels for various virtualization and effectively measure the interference so as to feedback the measured result to the feedback.

<Method for Configuring Channel Measurement Resource>

For the method for configuring a channel measurement resource proposed, the base station may configure a plurality of CSI-RS resources and a plurality of CSI-IM resources in one terminal. The base station may confirm the maximum CSI-RS resources and up to four CSI-IM resources. The base station may configure up to four CSI-RS resources and the maximum four CSI-IM resources in one terminal as higher signaling. Further, the base station may configure up to four channel measurement resources by a combination of the corresponding resources as the higher signaling. The combination of the resources may be configured like reference numeral 900 of FIG. 9.

Configuration A: CSI-RS#1 (channel measurement), CSI-IM (interference measurement)

Configuration B: CSI-RS#1 (channel measurement), CSI-RS#2 (channel measurement), CSI-IM (interference measurement)

Configuration C: CSI-RS#1 (channel measurement), CSI-IM#1 (interference measurement), CSI-IM#2 (interference measurement)

Configuration D: CSI-RS#1 (channel measurement), CSI-IM#1 (interference measurement), CSI-RS#1 (interference measurement)

When the method for configuring a channel measurement resource proposed uses the configurations A to D, the channel feedback of the terminal is as follows.

Drawing of RI $$R = \underset{rank \in p}{\operatorname{argmax}} \|\overline{H}P\| \qquad \text{<Equation 13>}$$

Drawing of PMI $$\hat{p} = \underset{p}{\operatorname{argmax}} \|\overline{H}P\| \qquad \text{<Equation 14>}$$

The RI and the PMI may be sequentially or simultaneously acquired. The precoder operated by the base station is configured as a set of different precoders for different ranks. When the specific precoder selects the optimal precoder like the above Equation 14, the terminal may select the rank of the corresponding precoder as the optimal RI like the above Equation 13.

The CQI of different methods is generated depending on the CQI receiver. The embodiment of the present invention mainly describes a minimum mean square error (MMSE) receiver but according to the subject matter of the present invention, the corresponding embodiment may be applied even to the receiver having different configurations.

Drawn configuration A of CQI (for example, in the case of the MMSE receiver, example of SINR for k-th layer)

$$\text{SINR}_k = (hp_{PMI})_k^+ (\overline{H}_{CSI\text{-}RS\#1}\hat{P}) (\overline{H}_{CSI\text{-}RS\#1}\hat{P})^+ + (I_{o,IMR} + N_0)I)^{-1}(hp_{PMI})_k \qquad \text{<Equation 15>}$$

In the case of the channel, the drawing of the SINR by the configuration A may acquire the channel information through CSI-RS#1 and in the case of the interference, the size of the interference signal may be acquired through the configured CSI-IM.

Drawn configuration B of CQI (for example, in the case of the MMSE receiver, example of SINR for k-th layer)

$$\text{SINR}_k = (hp_{PMI})_k^+ ((\overline{H}\hat{P})^+ + (I_{o,IMR} + N_0)I)^{-1}(hp_{PMI})_k \qquad \text{<Equation 16>}$$

In the case of the channel, the drawing of the SINR by the configuration B may be used for the virtualization method of acquiring the channel information through CSI-RS#1 and CSI-RS#2 and generating the channel through the Kronecker product. Further, this may be used for the virtualization method of acquiring the channel information through the CSI-RS#1 and the CSI-RS#2 and acquiring the channel by concatenating the channels. In the case of the interference, the size of the interference signal may be acquired through the CSI-IM.

Drawn configuration C of CQI (for example, in the case of the MMSE receiver, example of SINR for k-th layer)

$$\text{SINR}_k = (hp_{PMI})_k^+ ((\overline{H}_{CSI\text{-}RS\#1}\hat{P}) (\overline{H}_{CSI\text{-}RS\#1}\hat{P})^+ + (I_{o,IMR\#1} + I_{o,IMR\#2} + N_0)I)(h\ p_{PMI})_k \qquad \text{<Equation 17>}$$

In the case of the channel, the drawing of the SINR by the configuration C may be used for a method for acquiring the channel information through the CSI-RS#1 and acquiring the interference information through the CSI-IM#1 and the CSI-IM#2. In the case of the interference, the base station may transmit the interference signal to measure the interference within the self cell in the CSI-IM#1 and the interference out of the self cell in the CSI-IN#2. As another embodiment, the CSI-IM#1 may acquire the interference of adjacent users or the specific precoder and the CSI-IM#2 may acquire the interference of adjacent cells. As another example, the CSI-IM#1 may acquire the interference for the first virtualization cell within the cell and the CSI-IM#2 may acquire the size of the interference for the second virtualization cell within the cell.

Drawn configuration D of CQI (for example, in the case of the MMSE receiver, example of SINR for k-th layer)

$$\text{SINR}_k = (hp_{PMI})_k^+ ((\overline{H}_{CSI\text{-}RS\#1}\hat{P})(\overline{H}_{CSI\text{-}RS\#1}\hat{P})^+ + ((\overline{H}_{CSI\text{-}RS\#2}\hat{P})(\overline{H}_{CSI\text{-}RS\#2}\hat{P})^+ + I_{o,IMR} + N_0)I)^{-1}(h\ p_{PMI})_k \qquad \text{<Equation 18>}$$

In the case of the channel, the drawing of the SINR by the configuration C may be used for a method for acquiring the channel information through the CSI-RS#1 and acquiring the interference information through the CSI-RS#2 and the CSI-IM#1. In the case of the interference, the CSI-RS#2 may measure the channel of the interference cell and the interference cell may measure the interference under the assumption of the specific precoder. In this case, the interference of the rest cells other than the interference cell that may be measured in the CSI-IM may be measured and the interference cell that may be measured may be configured to be measured through the CSI-RS#2. As another embodiment, the precoder giving the largest interference in the interference cell is assumed and the corresponding channel is assumed not to give the interference, such that the SINR may be drawn. In this case, all the interferences are measured in the CSI-IM and the channel is measured in the measurable interference cell and then the corresponding interference is assumed to be removed like the following Equation 19, such that the SINR may be drawn.

$$\text{SINR}_k = (h\ p_{PMI})_k^+ ((\overline{H}_{CSI\text{-}RS\#1}\hat{P}) (\overline{H}_{CSI\text{-}RS\#1}\hat{P})^+ + (I_{o,IMR} - (\overline{H}_{CSI\text{-}RS\#2}\hat{P}_o)(\overline{H}_{CSI\text{-}RS\#2}\hat{P}_o)^+ + N_0)I)^{-1}(h\ p_{PMI})_k \qquad \text{<Equation 19>}$$

<Configuration Embodiment When Multiple Active Array Antenna and CoMP (Multiple Base Station Cooperation) are Simultaneously Performed>

For example, the case in which the terminal receives the configuration of four CSI-RS resources and four CSI-IM resources is assumed. When a total of four channel measurement resources is configured, the terminal may receive four configurations for the configuration A. At this point, the example of configuring four channel measurement resources using different four CSI-RSs and different four CSI-IMs is as follows.

Configuration 1: A—CSI-RS#1 (channel measurement), CSI-IM#1 (interference measurement)

Configuration 2: A—CSI-RS#2 (channel measurement), CSI-IM#2 (interference measurement)
Configuration 3: A—CSI-RS#3 (channel measurement), CSI-IM#3 (interference measurement)
Configuration 4: A—CSI-RS#4 (channel measurement), CSI-IM#4 (interference measurement)

TABLE 1

| Channel Resource (Measurement Resource Configuration) |
| --- |
| Sequence of CSI-RS index (1, . . . , maxCSI-RS = 4) CSI-RS resource |
| Sequence of CSI-IM index (1, . . . , maxCSI-IM = 4) CSI-IM resource |

TABLE 2

| Channel Resource Configuration (CSI feedback Configuration) |
| --- |
| Channel information: sequence of CSI-RS index |
| Interference information: sequence of CSI-RS index and/or IMR index |
| Reporting (feedback) mode |
| PMI codebook information |
| Etc . . . |

Here, the CSI-RS and the CSI-IM index are a method for indicating at least one CSIR-RS resource operated by the base station. For example, each CSI-RS index may indicate the resource information (for example, subframe information, subcarrier information) required to measure the channel state. For example, each CSI-IM index may indicate the resource information (for example, subframe information, subcarrier information) required to measure the channel state. According to the embodiment of the present invention, the CSI-RS index may be called the CSI-RS resource configuration information and the CSI-IM may be called the CSI-IM resource configuration information.

For example, the case in which the base station uses A, E, F, and G among the CSI-RS resources illustrated in FIG. 2 is assumed. The base station configures, in the terminal, the additional resource information like the time resource to which the corresponding resource is transmitted and may indicate the configured resource information by an index (for example, indexes 0 to 3). When the base station indicates the feedback configuration in the terminal, the base station indicates the CSI-RS resource or the CSI-IM resource. In this case, the base station may perform the indication by using the CSI-RS resource configuration indicated as an index instead of A to H and using different CSI-RS indexes and the same CSI-IM indexes per feedback resource.

The embodiment of the present invention may indicate a plurality of CSI-RS indexes or a plurality of CSI-IM indexes in one channel resource configuration (CSI-feedback configuration). Further, when the plurality of CSI-RS indexes or the plurality of CSI-IM indexes are indicated in one channel resource configuration, different resource configuration information may be present between different indexes.

As another example, the terminal may receive four configurations for the configuration B as the channel measurement resource. At this point, up to four CSI-RS#1, #2, #3, and #4 are transmitted to the two configuration information by two. In this case, one CSI-IM may be used.
Configuration 1: B—CSI-RS#1 (channel measurement), CSI-RS#2 (channel measurement), CSI-IM#1 (interference measurement)
Configuration 2: B—CSI-RS#3 (channel measurement), CSI-RS#4 (channel measurement), CSI-IM#2 (interference measurement)
Configuration 3: B—CSI-RS#1 (channel measurement), CSI-RS#2 (channel measurement), CSI-IM#3 (interference measurement)
Configuration 4: B—CSI-RS#3 (channel measurement), CSI-RS#4 (channel measurement), CSI-IM#4 (interference measurement)

As another example, the terminal may receive four configurations for the configuration C as the channel measurement resource. At this point, up to four CSI-RS#1, #2, #3, and #4 and a total of four CSI-IMs are transmitted to the configuration information. In this case, one CSI-RS and two CSI-IMs may be used.
Configuration 1: C—CSI-RS#1 (channel measurement), CSI-IM #1 (interference measurement), CSI-IM#2 (interference measurement)
Configuration 2: C—CSI-RS#2 (channel measurement), CSI-IM#3 (interference measurement), CSI-IM#4 (interference measurement)
Configuration 3: C—CSI-RS#3 (channel measurement), CSI-IM#1 (interference measurement), CSI-IM#3 (interference measurement)
Configuration 4: C—CSI-RS#4 (channel measurement), CSI-IM#2 (interference measurement), CSI-IM#4 (interference measurement)

As another example, the terminal may receive four configurations for the configuration D as the channel measurement resource. At this point, up to four CSI-RS#1, #2, #3, and #4 and a total of four CSI-IMs are transmitted to the configuration information. In this case, one CSI-RS and two CSI-IMs may be used.
Configuration 1: D—CSI-RS#1 (channel measurement), CSI-IM #1 (interference measurement), CSI-RS#3 (interference measurement)
Configuration 2: D—CSI-RS#1 (channel measurement), CSI-IM#2 (interference measurement), CSI-RS#4 (interference measurement)
Configuration 3: D—CSI-RS#2 (channel measurement), CSI-IM#3 (interference measurement), CSI-IM#3 (interference measurement)
Configuration 4: D—CSI-RS#2 (channel measurement), CSI-IM#4 (interference measurement), CSI-IM#4 (interference measurement)

For example, the corresponding configuration uses the two virtualization methods using the multiple active array antenna in the two base stations to allow Cell 1 to apply the first virtualization to the CSI-RS#1 and the second virtualization to the CSI-RS#3 and allow Cell 2 to apply the first virtualization to the CSI-RS#2 and the second virtualization to the CSI-RS#4. In this case, the configuration 1 is a method for measuring a channel in a cell consisting of the first virtualization, acquiring the interference channel in the signal consisting of the second virtualization of the same cell, and measuring the interference with the CSI-IM#1 in the rest cells.

The example of configuring the channel measurement resource using the four same configurations is described above, but the present invention may configure the same function even by the mixture of various configuration, and therefore is not limited thereto.

Figure 10:
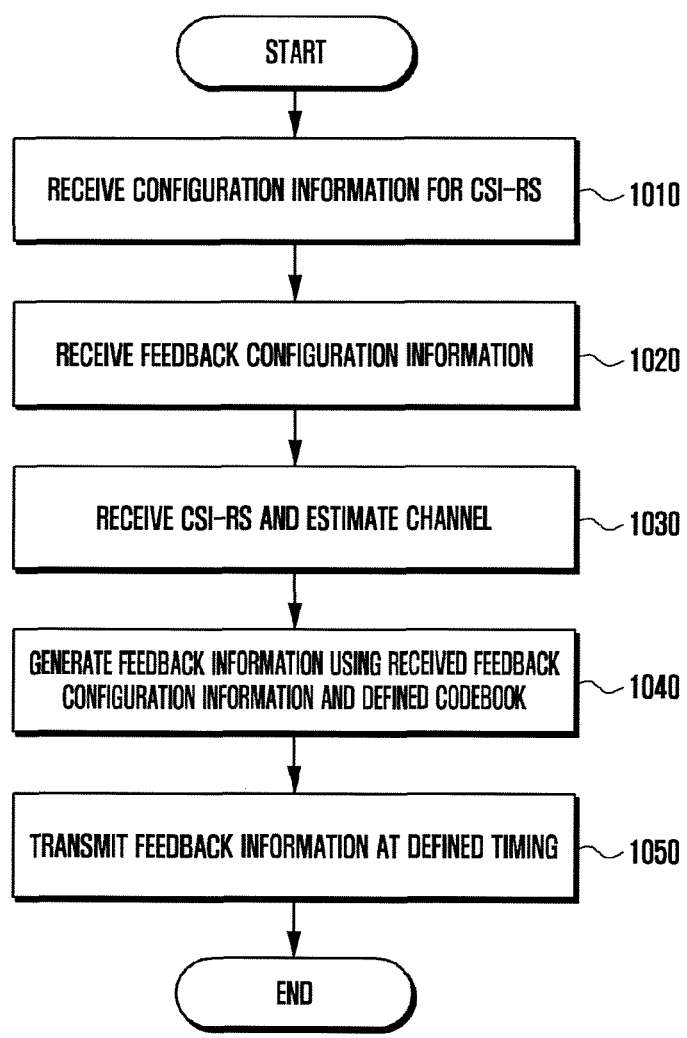
FIG. 10 is a flow chart of an operation order of a terminal according to an embodiment of the present invention.

FIG. 10 is a flow chart of an operation order of a terminal according to an embodiment of the present invention.

Referring to FIG. 10, the terminal receives the configuration information for at least one CSI-RS configuration (step 1010). The terminal may receive the configuration information for at least one CSI-RS configuration for at least one CSI channel estimation according to the virtualization proposed in the embodiment of the present invention. Further, the terminal may confirm all or some of the number of ports for each CSI-RS, the timing and the resource position at which each CSI-RS is transmitted, the sequence information, the transmission power information, or the like, based on the received configuration information.

Next, the terminal receives and confirms one feedback configuration information based on at least one CSI-RS in step 1020.

The feedback configuration includes the feedback mode (reporting or feedback mode) information that represents a kind of feedback information that the terminal generates and needs to feedback. That is, the feedback mode information allows the terminal to estimate the channel form the antenna port resource and generate each of the optima ranks therefor, the precoder matrix indicator (PMI) defining the precoding matrix, and the channel quality indicator (CQI) and notify the base station of the same.

The PMI codebook information means the information on the set of the precoding matrix that may be used in the current channel condition among the codebook. If the PMI codebook information is not included in the RRC information for feedback, the terminal may recognize that each feedback may be used to feedback all possible precoding matrices within the defined codebook.

The terminal estimates the channel between the base station antenna and the NRx receiving antennas in step 1030. Next, the terminal estimates the corresponding channel and generates the feedback information based on the channel added between the CSI-RSs (step 1040). The terminal may use the received feedback configuration and the defined codebook to generate the feedback information rank, the PMI, and the CQI. Next, in step 1050, the terminal transmits the feedback information to the base station at the corresponding feedback timing depending on the feedback configuration of the base station to finish a process of generating and reporting the channel feedback in consideration of the two-dimensional arrangement.

Figure 11:
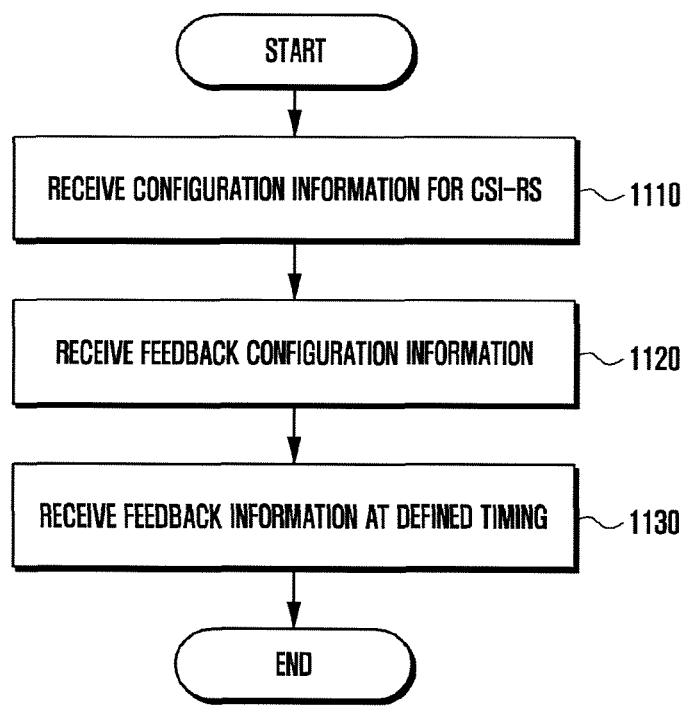
FIG. 11 is a flow chart of an operation order of a base station according to an embodiment of the present invention.

FIG. 11 is a flow chart of an operation order of a base station according to an embodiment of the present invention.

Referring to FIG. 11, the base station transmits the configuration information for at least one CSI channel feedback configuration for measuring the channel of the antenna port to the terminal in the step 1110. Further, the base station may confirm all or some of the number of ports for each CSI-RS, the timing and the resource position at which each CSI-RS is transmitted, the sequence information, the transmission power information, or the like, as the configuration information.

Next, in step 1120, the base station configures at least one feedback configuration information based on at least one CSI-RS to the terminal. Here, various virtualizations according to the embodiment of the present invention are assumed. Further, the feedback configuration for the CSI-RS may be configured as all or some of the RRC information as shown in the foregoing Tables 1 and 2.

Next, the base station transmits the configured CSI-RS to the terminal in step 1130. The terminal estimates the channels for each port and estimates an additional channel for the virtual channel based on the estimated channels. The terminal determines the feedback according to the embodiment proposed by the present invention and generates the CQI corresponding thereto and transmits the generated CQI to the base station.

Therefore, in step 1130, the base station receives the feedback information from the terminal and is used to determine the channel state between the mobile and the base station.

Figure 12:
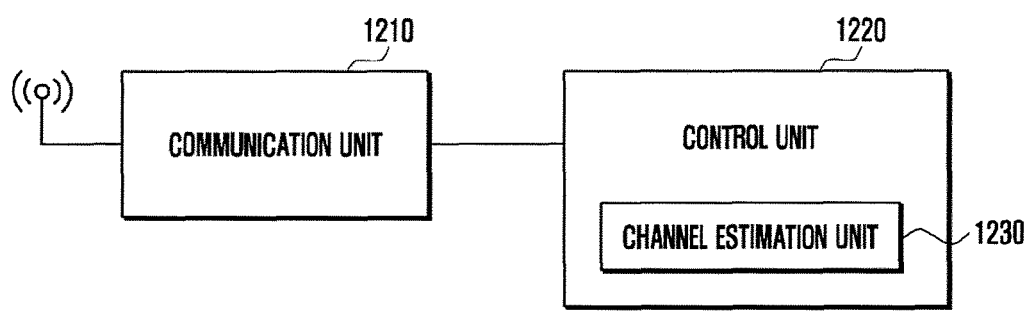
FIG. 12 is a block diagram illustrating an internal structure of the terminal according to the embodiment of the present invention.

FIG. 12 is a block diagram illustrating an internal structure of the terminal according to the embodiments of the present invention. Referring to FIG. 12, the terminal includes a communication unit 1210 and a control unit 1220.

The communication unit 1210 serves to transmit or receive data from outside (for example, base station). Further, the communication unit 1210 may transmit the feedback information to the base station under the control of the control unit 1220.

The control unit 1220 controls the state and operation of all the components configuring the terminal. In detail, the control unit 1220 generates the feedback information according to the information allocated from the base station. Further, the control unit 1220 controls the communication unit 1210 to feedback the generated channel information to the base station according to the timing information allocated from the base station. For this purpose, the control unit 1220 may configured to include a channel estimation unit 1230.

The channel estimation unit 1230 determines the required feedback information through the CSI-RS and the feedback allocation information received from the base station and thus estimates the channel using the received CSI-RS.

FIG. 12 illustrates an example that the terminal is configured to include the communication unit 1210 and the control unit 1220 but the terminal is not limited therefor and therefore may further include various components according to the function performed in the terminal. For example, the terminal may further include a display unit displaying the current state of the terminal, an input unit receiving a signal such as a function performance from the user, a storage unit storing data generated in the terminal, etc. Further, the above description illustrates that the control unit 1220 and the channel estimation unit 1230 are configured as the separate block but is not necessarily limited thereto. For example, the control unit 1230 may also perform the function of performing the channel estimation unit 1220.

In this case, the control unit 1220 may control the communication unit 1210 to receive the configuration information for at least one reference signal resource from the base station. Further, the control unit 1220 may control the communication unit 1210 to measure the at least one reference signal and receive the feedback configuration information for generating the feedback information depending on the measured result.

Further, the control unit 1220 may measure at least one reference signal received through the communication unit 1210 and generate the feedback information according to the feedback configuration information. Further, the control unit 1220 controls the communication unit 1210 to transmit the generated feedback information to the base station at the feedback timing depending on the feedback setting information.

Further, according to the embodiment of the present invention, the control unit 1220 may perform a control to receive, by the terminal, a first control message including a channel state information reference signal (hereinafter, referred to as CSI-RS) and channel state information interference measurement (hereinafter, referred to as CSI-IM) resource configuration information from a base station; receive, from the base station, a second control message including at least one first information for a channel measurement and at least one second information for an interference measurement; estimate a channel state for the base station on the basis of the first control message and the second control message; and report the channel state estimation result to the base station. In this case, the first information is selected from the CSI-RS resource configuration information, and the second information is selected from the CSI-RS resource configuration information or the CSI-IM resource configuration information.

Figure 13:
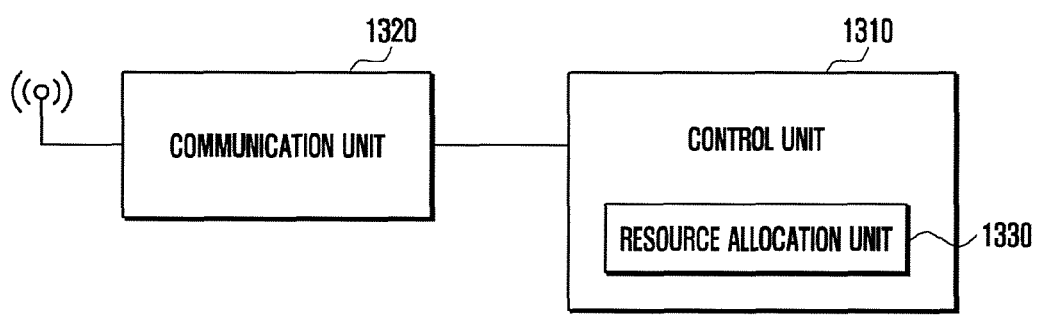
FIG. 13 is a block diagram illustrating an internal structure of the base station according to the embodiment of the present invention.

FIG. 13 is a block diagram illustrating an internal structure of the base station according to the embodiment of the present invention. Referring to FIG. 13, the base station includes a control unit 1310 and a communication unit 1320.

The control unit 1310 controls the state and operation of all the components configuring the base station. In detail, the control unit 1310 allocates the CSI-RS resource for the horizontal and vertical component channel estimation of the terminal to the terminal and allocates the feedback resource and the feedback timing to the terminal. For this purpose, the control unit 1310 may further include a resource allocation unit 1330.

The resource allocation unit 1330 allocates the CSI-RS to each of the resource so that the terminal may estimate each of the antenna ports by group and transmits the CSI-RS using the corresponding resources. Further, the feedback setting and the feedback timing are allocated so that the feedbacks from several terminals do not collide with each other and the feedback information set at the corresponding timing is received and analyzed.

The communication unit 1320 serves to transmit and receive the data, the reference signal, and the feedback information to and from the terminal. Here, the communication unit 1320 transmits the CSI-RS to the terminal through the resources allocated under the control of the control unit 1310 and receives the feedback on the channel information from the terminal.

The above description illustrates that the control unit 1310 and the channel allocation unit 1330 are configured as the separate block but is not necessarily limited thereto. For example, the control unit 1310 may also perform the function of performing the resource allocation unit 1330.

In this case, the control unit 1310 may control the communication unit 1320 to transmit the configuration information on each of the at least one reference signal to the terminal or generate the at least one reference signal. Further, the control unit 1310 may control the communication unit 1320 to transmit the feedback configuration information for generating the feedback information depending on the measured result to the terminal.

Further, the control unit 1310 may control the communication unit 1320 to transmit the at least one reference signal to the terminal and receive the feedback information transmitted from the terminal at the feedback timing depending on the feedback configuration information.

Further, according to the embodiment of the present invention, the control unit 1310 may perform a control to transmit, to a terminal, a first control message including a channel state information reference signal (hereinafter, referred to as CSI-RS) and channel state information interference measurement (hereinafter, referred to as CSI-IM) resource configuration information; transmit, to the terminal, a second control message including at least one first information for a channel measurement and at least one second information for an interference measurement; and receive, from the terminal, channel state feedback information measured on the basis of the first control message and the second control message. In this case, the control unit 1310 may perform a control to select the first information from the CSI-RS resource configuration information and select the second information from the CSI-RS resource configuration information or the CSI-IM resource configuration information.

Further, the second control message may be a combination of three resource configuration information selected from different CSI-RS and different CSI-IM resources included in the first control message.

In detail, the control unit 1310 may generate the second control message including the first information including different two CSI-RS resource configuration information for a channel measurement and the second information including one CSI-IM resource configuration information for an interference measurement. Further, the control unit 1320 may generate the second control message including the first information including the CSI-RS resource configuration information for a channel measurement and the second information including different two CSI-IM resource configuration information for an interference measurement. Further, the control unit 1320 may generate the second control message including the first information including the CSI-RS resource configuration information for a channel measurement and the second information including one CSI-IM resource configuration information and on CSI-RS resource configuration information for an interference measurement.

According to the embodiment of the present invention, the base station having the transmitting antenna of a large number of two-dimensional antenna array structures may prevent the allocation of the excessive feedback resources required to transmit the CSI-RS and the channel estimation complexity of the terminal from increasing and the terminal may effectively measure all the channels for a large number of transmitting antennas, configure the measured result as the feedback information, and notify the base station of the same.

According to the embodiment of the present invention as described above, the base station having a large number of transmitting antennas may prevent the allocation of the excessive radio resources required to transmit the CSI-RS using various virtualizations like the multiple antenna array base station and the terminal may measure the channels for a large number of transmitting antennas, configure the measured result as the feedback information, and notify the base station of the same.

The embodiments of the present disclosure disclosed in the present specification and the accompanying drawings have been provided only as specific examples in order to assist in understanding the present disclosure and do not limit the scope of the present invention. Therefore, it is to be understood that in addition to the exemplary embodiments of the present invention described herein, all the changed or modified forms derived from the technical spirit of the present invention are included in the scope of the present invention.

The invention claimed is:

1. A method for receiving channel measurement information of a base station in a mobile communication system, comprising:
    transmitting, to a terminal, a first control message including a channel state information reference signal (CSI-RS) and channel state information interference measurement (CSI-IM) resource configuration information;
    transmitting, to the terminal, a second control message including at least one first information for a channel measurement and at least one second information for an interference measurement; and receiving, from the terminal, channel state feedback information measured based on the first control message and the second control message, wherein when the at least one first information indicates one CSI-RS information and the at least one second information indicates first CSI-IM information and second CSI-IM information, the first CSI-IM is used for measuring a first interference in a serving cell and the second CSI-IM is used for measuring a second interference from at least one neighbor cell.

2. The method of claim 1, wherein the second control message consists of a combination of three resource configuration information selected from CSI-RS information and CSI-IM information included in the first control message.

3. The method of claim 1, wherein when the at least one first information indicates two different CSI-RS information and the at least one second information indicates one CSI-IM information, the two different CSI-RS information are used for measuring channel state.

4. The method of claim 1, wherein when the at least one first information indicates first CSI-RS information and the at least one second information indicates one CSI-IM information and second CSI-RS information, the second CSI-RS information is used for measure an interference of an interference cell by assuming a precoder corresponding to the second CSI-RS information.

5. A base station apparatus for receiving channel measurement information in a mobile communication system, comprising:
   a transceiver configured to transmit and receive a signal; and
   a controller configured to:
      transmit, to a terminal, a first control message including a channel state information reference signal (CSI-RS) and channel state information interference measurement (CSI-IM) resource configuration information;
      transmit, to the terminal, a second control message including at least one first information for a channel measurement and at least one second information for an interference measurement; and
      receive, from the terminal, channel state feedback information measured based on the first control message and the second control message,
   wherein if when the at least one first information indicates one CSI-RS information and the at least one second information indicates first CSI-IM information and second CSI-IM information, the first CSI-IM is used for measuring a first interference in a serving cell and the second CSI-IM is used for measuring a second interference from at least one neighbor cell.

6. The base station apparatus of claim 5, wherein the second control message is configured of a combination of three resource configuration information selected from CSI-RS information and CSI-IM information included in the first control message.

7. The base station apparatus of claim 5, wherein when the at least one first information indicates two different CSI-RS information and the at least one second information indicates one CSI-IM information, the two different CSI-RS information are used for measuring channel state.

8. The base station apparatus of claim 5, wherein when the at least one first information indicates first CSI-RS information and the at least one second information indicates one CSI-IM information and second CSI-RS information, the second CSI-RS information is used for measure an interference of an interference cell by assuming a precoder corresponding to the second CSI-RS information.

9. A method for reporting channel measurement information of a terminal in a mobile communication system, comprising:
   receiving, by the terminal, a first control message including a channel state information reference signal (CSI-RS) and channel state information interference measurement (CSI-IM) resource configuration information from a base station;
   receiving, from the base station, a second control message including at least one first information for a channel measurement and at least one second information for an interference measurement;
   estimating a channel state for the base station based on the first control message and the second control message; and
   reporting the channel state estimation result to the base station,
   wherein when the at least one first information indicates one CSI-RS information and the at least one second information indicates first CSI-IM information and second CSI-IM information, the first CSI-IM is used for measuring a first interference in a serving cell and the second CSI-IM is used for measuring a second interference from at least one neighbor cell.

10. The method of claim 9, wherein the second control message consists of a combination of three resource configuration information selected from CSI-RS information and CSI-IM information included in the first control message.

11. The method of claim 9, wherein when the at least one first information indicates two different CSI-RS information and the at least one second information indicates one CSI-IM information, the two different CSI-RS information are used for measuring channel state.

12. The method of claim 9, wherein when the at least one first information indicates first CSI-RS information and the at least one second information indicates one CSI-IM information and second CSI-RS information, the second CSI-RS information is used for measure an interference of an interference cell by assuming a precoder corresponding to the second CSI-RS information.

13. A terminal apparatus for reporting channel measurement information in a mobile communication system, comprising:
   a transceiver configured to transmit and receive a signal; and
   a controller configured to:
      receive, by the terminal, a first control message including a channel state information reference signal (CSI-RS) and channel state information interference measurement (CSI-IM) resource configuration information from a base station;
      receive, from the base station, a second control message including at least one first information for a channel measurement and at least one second information for an interference measurement;
      estimate a channel state for the base station based on the first control message and the second control message; and
      report the channel state estimation result to the base station,
   wherein when the at least one first information indicates one CSI-RS information and the at least one second information indicates first CSI-IM information and second CSI-IM information, the first CSI-IM is used for measuring a first interference in a serving cell and the second CSI-IM is used for measuring a second interference from at least one neighbor cell.

14. The terminal apparatus of claim 13, wherein the second control message consists of a combination of three resource configuration information selected from CSI-RS information and CSI-IM information included in the first control message.

15. The terminal apparatus of claim 13, wherein when the at least one first information indicates two different CSI-RS information and the at least one second information indicates one CSI-IM information, the two different CSI-RS information are used for measuring channel state.

16. The terminal apparatus of claim 13, wherein when the at least one first information indicates first CSI-RS information and the at least one second information indicates one CSI-IM information and second CSI-RS information, the second CSI-RS information is used for measure an interference of an interference cell by assuming a precoder corresponding to the second CSI-RS information.

* * * * *